United States Patent Office 2,780,077
Patented Feb. 5, 1957

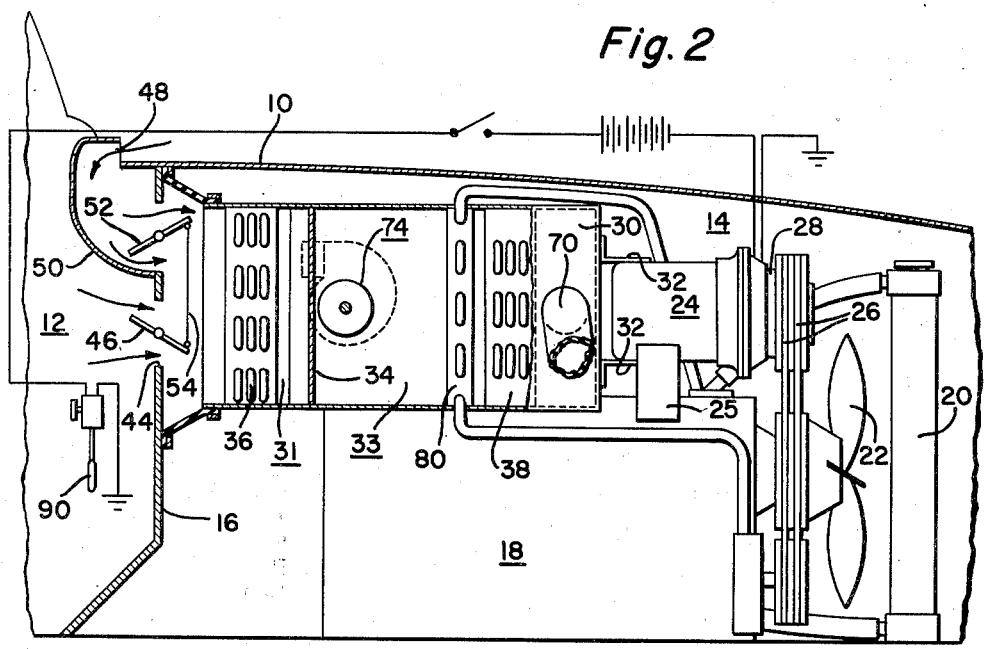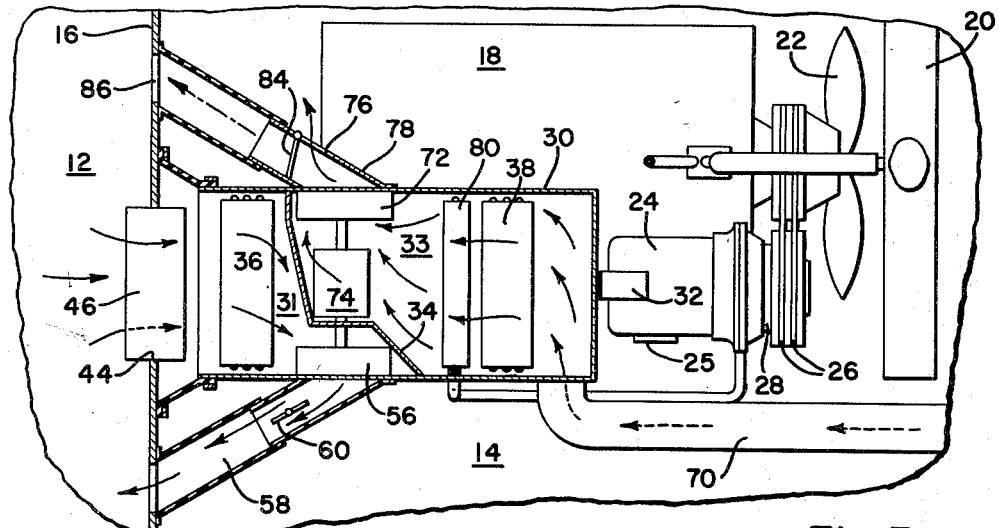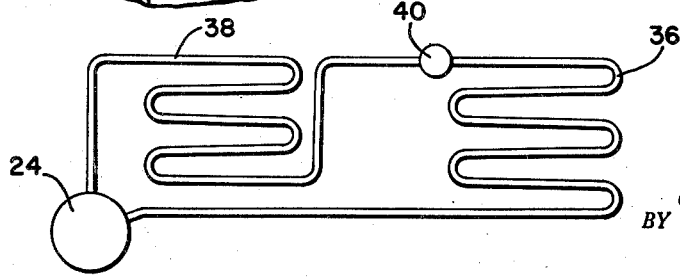

2,780,077

VEHICLE REFRIGERATING APPARATUS

James W. Jacobs, Dayton, Ohio, assignor to General Motors Corporation, Detroit, Mich., a corporation of Delaware Application July 21, 1954, Serial No. 444,838

4 Claims. (Cl. 62—117.1)

This invention relates to refrigerating apparatus and more particularly to an automobile air conditioning system.

It is an object of this invention to provide a self-contained automobile air conditioning unit which may be assembled and charged with refrigerant at the factory for subsequent installation as a unit in the engine compartment of a passenger automobile.

Another object of this invention is to provide a simple and compact air conditioning unit which may be used for selectively heating or cooling the passenger compartment of a car.

Still another object of this invention is to provide an automobile air conditioning unit in which the air circulated over the condenser of a volatile refrigerant system is discharged into the passenger compartment when it is desired to heat the passenger compartment.

Further objects and advantages of the present invention will be apparent from the following description, reference being had to the accompanying drawings, wherein a preferred form of the present invention is clearly shown.

In the drawings:

Figure 1 is a diagrammatic view showing the refrigerant circuit;

Figure 2 is a fragmentary vertical sectional view with parts broken away showing the arrangement of the air conditioning unit and air ducts with relation to the engine and passenger compartments of the car; and, Figure 3 is a top view with parts broken away also showing the arrangement of the air conditioning unit and air ducts within the car.

Referring now to the drawings wherein a preferred form of the invention is shown, reference numeral 10 generally designates a conventional passenger automobile having a passenger compartment 12 and an engine compartment 14 separated from one another by means of the usual firewall 16. Power for operating the automobile is provided by a conventional engine 18 provided with the usual engine radiator 20 and an air circulating fan 22 which is driven from the main car engine in accordance with standard practice.

The air conditioning equipment comprises a compressor 24 which is adapted to be mounted in the engine compartment of the car alongside of the car engine 18 by means of a bracket 25 as shown. The compressor 24 is adapted to be driven from the main car engine through belt means 26 and a solenoid operated clutch 28. The compressor 24 is secured to the housing 30 by means of suitable brackets such as those designated by the reference numeral 32.

A partition 34 separates the housing 30 into two compartments 31 and 33 as shown in Figure 3. A refrigerant evaporator 36 is mounted in the compartment 31, hereinafter referred to as the evaporator compartment, and a condenser 38 and heater coil 80 are mounted in the compartment 33 which is hereinafter referred to as the condenser compartment. The compressor 24, evaporator 36 and condenser 38 are connected in refrigerant flow relationship as best shown in Figure 1 of the drawing. A flow control valve or restrictor element 40 is provided for controlling the flow of refrigerant from the condenser 38 to the evaporator 36 in accordance with standard practice so as to cause the condenser 38 to dissipate the heat picked up by the evaporator 36.

The air conditioner may be used for cooling either fresh outside air, recirculated air or a mixture of both. Recirculated air to be conditioned during the cooling season enters the evaporator compartment through a return air inlet 44 in which there is mounted a control damper 46 as best shown in Figure 2. Fresh air to be conditioned may enter the evaporator compartment through the fresh air inlet 48 which is located directly at the base of the windshield and which supplies air into a fresh air duct 50. A damper 52 has been provided as shown for controlling the admission of fresh air into the evaporator compartment through the fresh air duct. The dampers 46 and 52 are connected to be operated in unison by means of a link 54 so as the fresh air damper is opened to admit an increased amount of fresh air, the return air damper 46 is correspondingly closed to restrict the amount of return air. Likewise, if it is desired to restrict the introduction of fresh air, the fresh air damper 52 may be moved toward the closed position and the return air damper 46 will then be moved a corresponding amount toward the open position. An evaporator fan 56 is arranged as shown in Figure 3 and serves to pull air in over the evaporator and to discharge the refrigerated air through a duct 58 which discharges the conditioned air into the passenger compartment of the car. In order to simplify this disclosure, the means for distributing the conditioned air within the passenger compartment of the car has not been shown, but it is to be understood that any suitable type of air distributing means or duct arrangement could be provided in the passenger compartment. A damper 60 is provided in the duct 58 so as to control the flow of air through the evaporator compartment of the unit.

The heat picked up by the evaporator 36 during the cooling season is dissipated into the air flowing over the condenser 38 in accordance with standard refrigeration principles. The condenser cooling air is adapted to enter the condenser compartment through a duct 70 which conveys fresh air from the front end of the car to the front end of the condenser compartment 33. A fan 72 is provided for forcefully circulating air over the condenser. The fans 56 and 72 are adapted to be driven by a common motor 74 which is arranged as shown in Figure 3. During the summer season when no heating is required in the passenger compartment of the car, all of the air which flows through the condenser compartment is adapted to be discharged directly into the engine compartment of the car through an air outlet 76 located in a side air duct 78.

An air heating coil 80 is provided in the condenser compartment as shown in Figures 2 and 3 and is used for heating the air flowing through the condenser compartment whenever it is desired to provide auxiliary heating of the air supplied to the passenger compartment of the car. The heating coil 80 is connected to receive hot water from the main car engine cooling system in accordance with standard car heating practice. The damper 84, located in the duct 78, is moved from the position in which it is shown in Figure 3 to a position in which it prevents any of the heated air from being discharged out of the air outlet 76 when it is desired to supply heated air to the passenger compartment. This causes all of the air flowing through the condenser compartment to be discharged into the passenger compartment of the car through the air outlet 86. By virtue of the above described arrangement, it is possible to utilize the system shown herein not only for heating but also for removing moisture from the air in the passenger compartment without reducing the temperature of the air in the passenger compartment merely by allowing the evaporator to cool the one stream of air discharged into the passenger compartment and allowing the condenser to heat a second stream of air which may also be discharged into the passenger compartment so as to counteract the cooling effect of the evaporator.

Reference is made to the following prior filed applications:

Ser. No. 365,593 filed July 2, 1953,
Ser. No. 376,606 filed August 26, 1953, now Patent No. 2,747,385,
Ser. No. 435,108 filed June 8, 1954,
Ser. No. 430,890 filed May 19, 1954 and
Ser. No. 430,891 filed May 19, 1954.

For purposes of illustration, a thermostat 90 has been shown for controlling the operation of the clutch 28 whereas the clutch 28 could be manually controlled and the thermostat 90 could be used to control the damper 84 and/or the damper 60. Other control arrangements of the type shown in the above mentioned applications could also be used.

While the form of embodiment of the invention as herein disclosed constitutes a preferred form, it is to be understood that other forms might be adopted, as may come within the scope of the claims which follow.

What is claimed is as follows:

1. In a self-contained air conditioning unit for use in passenger automobiles or the like, the combination, a casing, an evaporator in said casing, a condenser in said casing, means dividing said casing into the evaporator compartment and a condenser compartment, a compressor secured to said casing, means for transmitting power from the engine of said automobile to said compressor, refrigerant flow connections between said evaporator, compressor and condenser, means for introducing fresh air into the said condenser compartment, means for selectively directing the air leaving said condenser compartment either into said passenger compartment or into the outside atmosphere, means for selectively introducing either fresh air, recirculated air or a mixture of both into said evaporator compartment, blower means for facilitating the flow of air through said evaporator and condenser compartments, and means for directing the air flowing over said evaporator into said passenger compartment, said blower means comprising a pair of blowers operated by a common motor disposed between said evaporator and said condenser.

2. In combination; a vehicle having a passenger compartment and an engine compartment separated from one another by means of a firewall having air opening means therein; an engine within said engine compartment; a self-contained refrigeration system disposed wholly within said engine compartment and comprising a compressor, a condenser, an evaporator, refrigerant flow connections between said compressor, condenser and evaporator, a housing for enclosing said evaporator and said condenser, and partition means dividing said housing into an evaporator compartment and a condenser compartment; torque transmitting means between said engine and said compressor; means for supporting said housing with the evaporator compartment adjacent said firewall; flexible duct means connecting said housing with said air opening means so as to allow for limited relative movement between said housing and said firewall; said flexible duct means comprising a first duct for conveying air from said passenger compartment to said evaporator compartment, a second duct for conveying air from said evaporator compartment to said passenger compartment, a third duct for conveying fresh air into said evaporator compartment, and a fourth duct for conveying air from said condenser compartment into said passenger compartment.

3. In combination; a vehicle having a passenger compartment and an engine compartment separated from one another by means of a firewall having air opening means therein; an engine within said engine compartment; a self-contained refrigeration system disposed wholly within said engine compartment and comprising a compressor, a condenser, an evaporator, refrigerant flow connections between said compressor, condenser and evaporator, a housing for enclosing said evaporator and said condenser, and partition means dividing said housing into an evaporator compartment and a condenser compartment; torque transmitting means between said engine and said compressor; means for supporting said housing with the evaporator compartment adjacent said firewall; flexible duct means connecting said housing with said air opening means so as to allow for limited relative movement between said housing and said firewall; said flexible duct means comprising a first duct for conveying air from said passenger compartment to said evaporator compartment, a second duct for conveying air from said evaporator compartment to said passenger compartment, a third duct for conveying fresh air into said evaporator compartment, a fourth duct for conveying air from said condenser compartment into said passenger compartment; said fourth duct having an air outlet in its one wall for discharging air from said condenser compartment into the outside atmosphere.

4. In a self-contained air conditioning unit for use in passenger automobiles or the like, the combination, a casing, an evaporator in said casing, a condenser in said casing, means dividing said casing into the evaporator compartment and a condenser compartment, a compressor, means for transmitting power from the engine of said automobile to said compressor, refrigerant flow connections between said evaporator, compressor and condenser, means for introducing fresh air into the said condenser compartment, means for selectively directing the air leaving said condenser compartment either into said passenger compartment or into the outside atmosphere, means for selectively introducing either fresh air, recirculated air or a mixture of both into said evaporator compartment, blower means for facilitating the flow of air through said evaporator and condenser compartments, and means for simultaneously directing the air flowing over said evaporator and over said condenser into said passenger compartment so as to cause dehumidification of the air without lowering the temperature of the air in said passenger compartment.

References Cited in the file of this patent
UNITED STATES PATENTS

| | | |
|---|---|---|
| 2,187,982 | Moncrief | Jan. 23, 1940 |
| 2,264,848 | Kahl | Dec. 2, 1941 |
| 2,318,893 | Smith | May 11, 1943 |
| 2,401,560 | Graham et al. | June 4, 1946 |
| 2,538,382 | Reilly | Jan. 16, 1951 |